(12) United States Patent
Liu et al.

(10) Patent No.: US 7,743,691 B2
(45) Date of Patent: Jun. 29, 2010

(54) WORKPIECE FEEDING STOPPER FOR TABLE SAW

(75) Inventors: Chia-Sheng Liu, Chiayi County (TW); Yu-Feng Chan, Kaohsiung County (TW)

(73) Assignee: Durq Machinery Corp., Hsiang Taichung (TW)

( * ) Notice: Subject to any disclaimer, the term of this patent is extended or adjusted under 35 U.S.C. 154(b) by 474 days.

(21) Appl. No.: 11/840,013

(22) Filed: Aug. 16, 2007

(65) Prior Publication Data

US 2009/0044673 A1 Feb. 19, 2009

(30) Foreign Application Priority Data

Mar. 21, 2007 (TW) ............................. 96109805 A

(51) Int. Cl.
*B23D 45/06* (2006.01)
*B27B 5/29* (2006.01)

(52) U.S. Cl. ........................................ 83/478; 83/102.1

(58) Field of Classification Search .................. 83/478, 83/440.2, 477.2, 102.1
See application file for complete search history.

(56) References Cited

U.S. PATENT DOCUMENTS

| | | | | |
|---|---|---|---|---|
| 87,700 A | * | 3/1869 | Pagett | ................... 144/250.18 |
| 278,130 A | * | 5/1883 | Groff | ......................... 83/440.2 |
| 281,274 A | * | 7/1883 | Kuhlman | .................... 83/102.1 |
| 3,249,134 A | * | 5/1966 | Vogl et al. | ..................... 83/478 |
| 5,842,400 A | * | 12/1998 | McIntosh | .................... 83/477.2 |
| 6,840,144 B2 | * | 1/2005 | Huang | ........................ 83/102.1 |
| 7,631,585 B2 | * | 12/2009 | Ichikawa et al. | ........... 83/102.1 |
| 2004/0255745 A1 | * | 12/2004 | Peot et al. | ................... 83/102.1 |
| 2007/0000366 A1 | * | 1/2007 | Peot et al. | ................... 83/102.1 |
| 2007/0056416 A1 | * | 3/2007 | Shibata | ...................... 83/440.2 |
| 2007/0151432 A1 | * | 7/2007 | Garcia et al. | ............... 83/477.2 |
| 2007/0186741 A1 | * | 8/2007 | Buck et al. | .................... 83/438 |
| 2009/0229437 A1 | * | 9/2009 | Tanaka | ....................... 83/440.2 |

* cited by examiner

*Primary Examiner*—Kenneth E. Peterson
*Assistant Examiner*—Sean Michalski
(74) *Attorney, Agent, or Firm*—Browdy and Neimark, PLLC

(57) ABSTRACT

A workpiece feeding stopper for use in a stable saw to prevent careless feed of a workpiece having a height greater than a cutting depth of a circular saw blade includes a support arm having a rear end adapted for connection with a spreader of the table saw. A stop member is provided at a front end of the support arm and has a stop face with a bottom edge adapted for being spaced above from a worktable of the table saw by a distance slightly greater than or equal to a cutting depth of the circular saw blade and smaller than a distance between a pivot where a blade guard of the table saw and the spreader are pivotally connected to and the worktable, thereby enabling the workpiece to be completely cut without being stopped by the pivot.

10 Claims, 7 Drawing Sheets

WORKPIECE FEEDING STOPPER FOR TABLE SAW

BACKGROUND OF THE INVENTION

1. Field of the Invention

The present invention relates generally to table saws and more specifically, to a workpiece feeding stopper for a table saw for avoiding incomplete cutting of a workpiece by the circular saw blade.

2. Description of the Related Art

FIG. 1 shows a conventional table saw 1, which comprises a base 2, a circular saw blade 3, a spreader 4 which is also called a riving knife, and a blade guard 5. The base 2 has a worktable 6 for supporting a workpiece 7, lumber for example, for cutting. The saw blade 4 can be risen and fallen relative to the worktable 6. When the saw blade is risen, that is, when the saw blade extends through the worktable, the saw blade 4 can be operated to cut the workpiece 7. The spreader 4 is connected to the saw blade 4 through a coupling unit (not shown), and can synchronously rise and fall together with the saw blade 3. The spreader 4 is adapted to prevent the cut parts of the workpiece from closing on the back of the saw blade 4 during cutting. The blade guard 5 has one end pivoted to the top side of the spreader 4. When the table saw 1 is not in operation, the blade guard 5 is turned downwards to cover the saw blade 4, preventing operators from accidental injuries. During the cutting work of the table saw 1, the spreader 4 is turned upwards and opened from the saw blade 4.

During the use of the table saw 1, the worker may pick up a workpiece 7 that has a height exceeding the distance between a pivot point P where the blade guard 5 and the spreader 4 are pivotally connected to and the top surface of the worktable 6. In such circumstance, the workpiece 7 may be cut to a certain extent until one end of the workpiece 7 is stopped at the pivot point P between the blade guard 5 and the spreader 4. At this time, the worker must stop the machine and then move the workpiece 7 away from the saw blade 3, and then re-feed a workpiece with a height suitable for cutting, resulting in delay of cutting work and waste of workpiece.

SUMMARY OF THE INVENTION

The present invention has been accomplished in view of the above-noted circumstances. It is the primary objective of the present invention to provide a workpiece feeding stopper for a table saw, which enables the workpiece to be completely cut.

To achieve this objective of the present invention, the workpiece feeding stopper for use in a table saw that includes a machine base with a worktable, a circular saw blade moveable downwards and upwards relative to the worktable, and a spreader movable downwards and upwards together with the circular saw blade comprises a support arm and a stop member. The support arm has a rear end adapted for connection with the spreader. The stop member is provided at a front end of the support arm and has a stop face with a bottom edge adapted for being spaced above from the worktable by a distance slightly greater than or equal to a cutting depth of the circular saw blade. In addition, the distance is smaller than a distance between a pivot by which a blade guard of the table saw is pivotally connected with the spreader and the worktable of the machine base. Therefore, if a worker intends to feed a workpiece having a height greater than the cutting depth of the circular saw blade or the distance between the pivot and the worktable of the machine base, the workpiece will be stopped by the stop member and will not be cut by the circular saw blade.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 3:
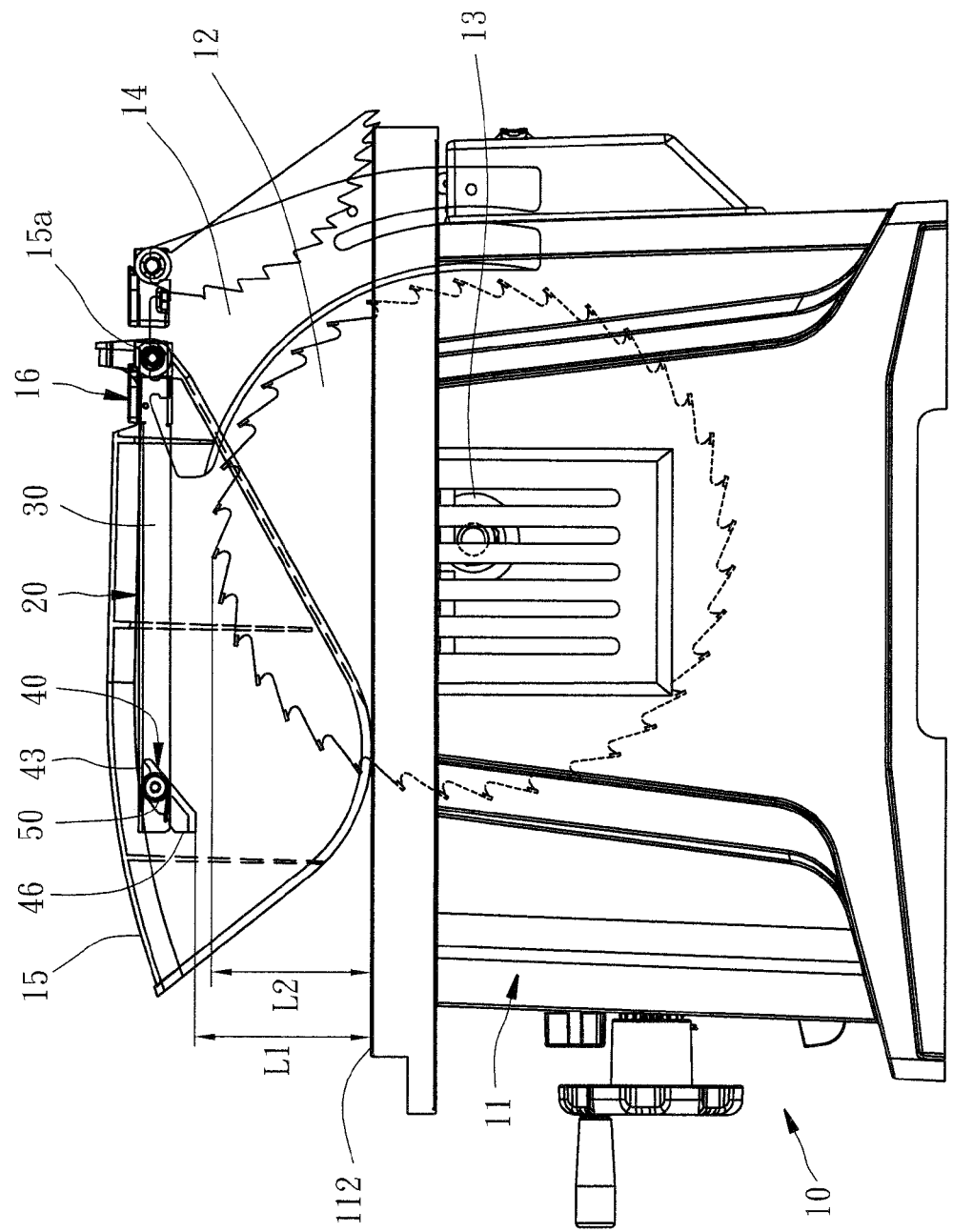
FIG. 3 is a side view showing that the workpiece feeding stopper of the first preferred embodiment of the present invention is installed in a table saw.

FIG. 3 shows a workpiece feeding stopper 20 in accordance with a first embodiment of the present invention is installed in a table saw 10. The table saw 10 comprises a machine base 11, a circular saw blade 12, a motor drive 13, a spreader 14, and a blade guard 15.

The machine base 11 has a worktable 112 for supporting a workpiece to be cut. The saw blade 12 is mounted inside the machine base 11 by means of a lifting mechanism (not shown), and can be actuated by the lifting mechanism to move downwards and upwards relative to the worktable 112. The motor drive 13 is adapted to rotate the saw blade 12 for cutting off the workpiece placed on and fed along the worktable 112. The spreader 14 is indirectly connected with the saw blade 12 through a coupling unit (not shown), and synchronously movable together with the saw blade 12 when the saw blade is moved downwards or upwards. The blade guard 15 is detachably pivotally coupled to the spreader 14 through a quick release 16, and can be turned about a pivot 15a downwards and upwards relative to the spreader 14. The aforesaid elements of the table saw are of the known arts and are not the primary technical features of the present invention. Further, the function and detailed particulars of the quick release 16 have been described in the specification of Taiwan patent application no. 95144266 filed by the present applicant. Therefore, no further detailed description with regard to the table saw is necessary.

Figure 1:
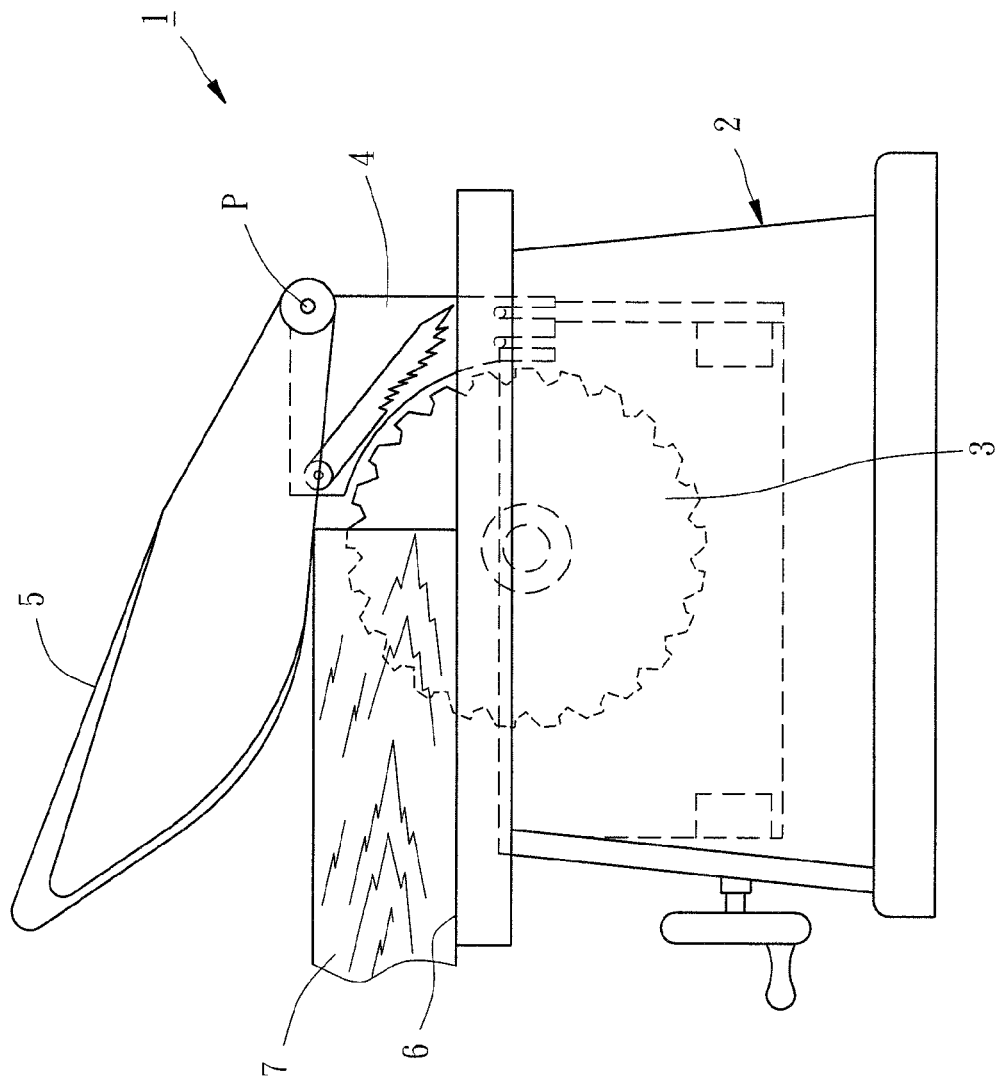
FIG. 1 is a schematic drawing of a conventional table saw.
Figure 2:
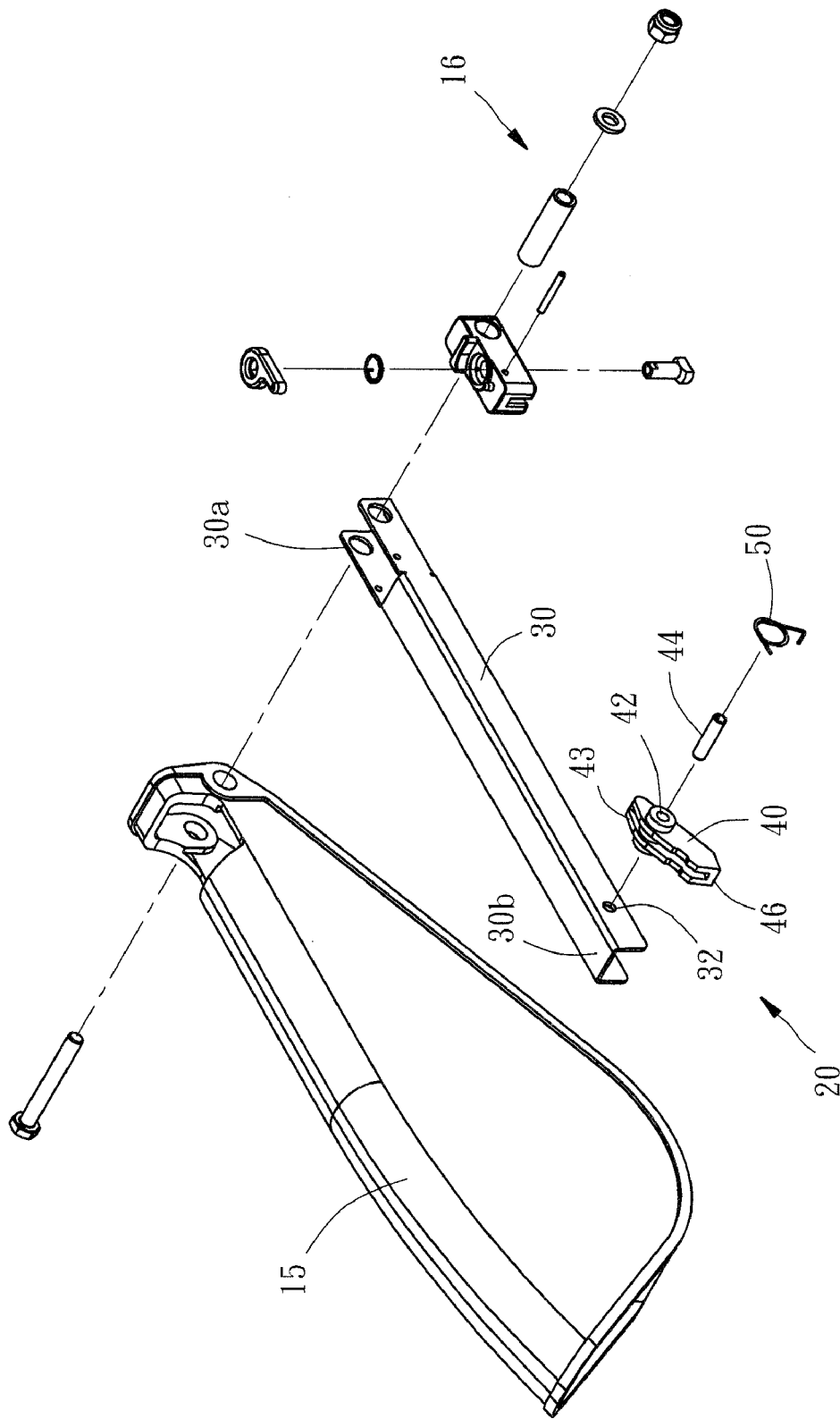
FIG. 2 is an exploded view of a workpiece feeding stopper in cooperation with a blade guard of a table saw according to a first preferred embodiment of the present invention.

Referring to FIG. 2 and FIG. 3 again, the workpiece feeding stopper 20 comprises a support arm 30, a stop member 40 and an elastic member, for example, torsional spring 50.

The support arm 30 has its rear end 30a connected with the blade guard 15 and the spreader 14 through the aforesaid quick release 16, and supported on the quick release 16 above the top cutting edge of the saw blade 12 in parallel to the worktable 112. The support arm 30 has a through hole 32 on its front end 30b. Further, it is to be mentioned that the upward and downward pivotal movement of the blade guard 15 relative to the worktable 112 will not result in movement of the support arm 30, that is, the support arm 30 will be kept in position when the blade guard 15 moves upwards or downwards.

The stop member 40 has a pivot hole 42 and a bearing face 43 at its rear end, and a stop face 46 at its front end. A pivot pin 44 is mounted in the through hole 32 of the support arm 30 and the pivot hole 42 of the stop member 40 to pivotally secure the stop member 40 to the front end 30b of the support arm 30. When the saw blade 12 is risen to the working position for cutting, the torsional spring 50 that is mounted on the pivot pin 44 imparts a biasing force to return the biased stop member 44 to its normal position, as shown in FIG. 3. By means of the biasing pressure from the torsional spring 50, the stop member 44 will be forced to turn outwards in counter-clockwise direction until the bearing face 43 is stopped against the inner side of the support arm 30. At this time, the extending direction of the stop face 46 is kept in a perpendicular manner relative to the worktable 112 of the machine base 11. The distance between the bottom edge of the stop face 46 and the top surface of the worktable 112 of the machine base 11 is indicated in FIG. 3 by the numeral notation L1, and the distance between the top cutting edge of the saw blade 12 and the top surface of the worktable 112 of the machine base 11, i.e. the cutting depth of the saw blade 12, is also indicated in FIG. 3 by the numeral notation L2. The distance L1 is slightly greater than or equal to the distance L2. The difference between the distance L1 and the distance L2 is preferably set in the range of within 10 mm when the distance L1 is set to be slightly greater than the distance L2 so that a small external force can separate the workpiece easily after cutting. More preferably, the difference between the distance L1 and the distance L2 is set as smaller as possible. In addition, the distance L1 must be smaller than the distance between the pivot 15a and the top surface of the worktable 112 of the machine base 11

Figure 4:
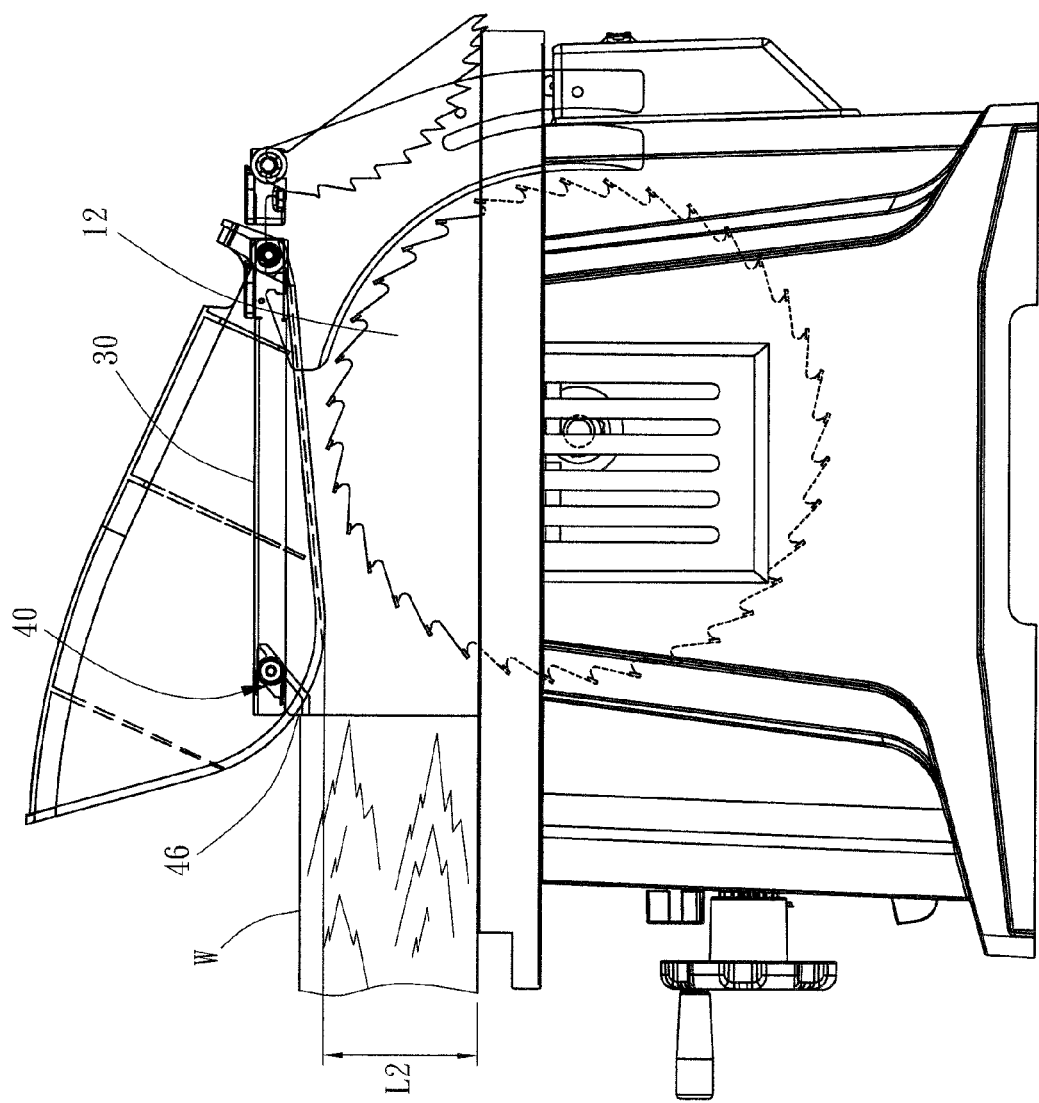
FIG. 4 is a schematic drawing showing that a workpiece having a height greater than the cutting depth of the circular saw blade is stopped by the workpiece feeding stopper of the first preferred embodiment of the present invention.

As shown in FIG. 4, if the worker carelessly feeds along the worktable 112 a workpiece W that has a height greater than the distance between the pivot 15a and the top surface of the worktable 112 of the machine base 11, the workpiece W will be stopped by the stop face 46 of the stop member 40 and prohibited from being moved by the worker to the saw blade 12, thereby avoiding a potential problem of incomplete cutting or waste of workpiece material. In other words, the stop member 40 of the workpiece feeding stopper 20 can help the worker examine whether the cutting depth of the saw blade 12 that protrudes over the top surface of the worktable 112 is suitable for cutting the workpieces to be cut.

Figure 5:
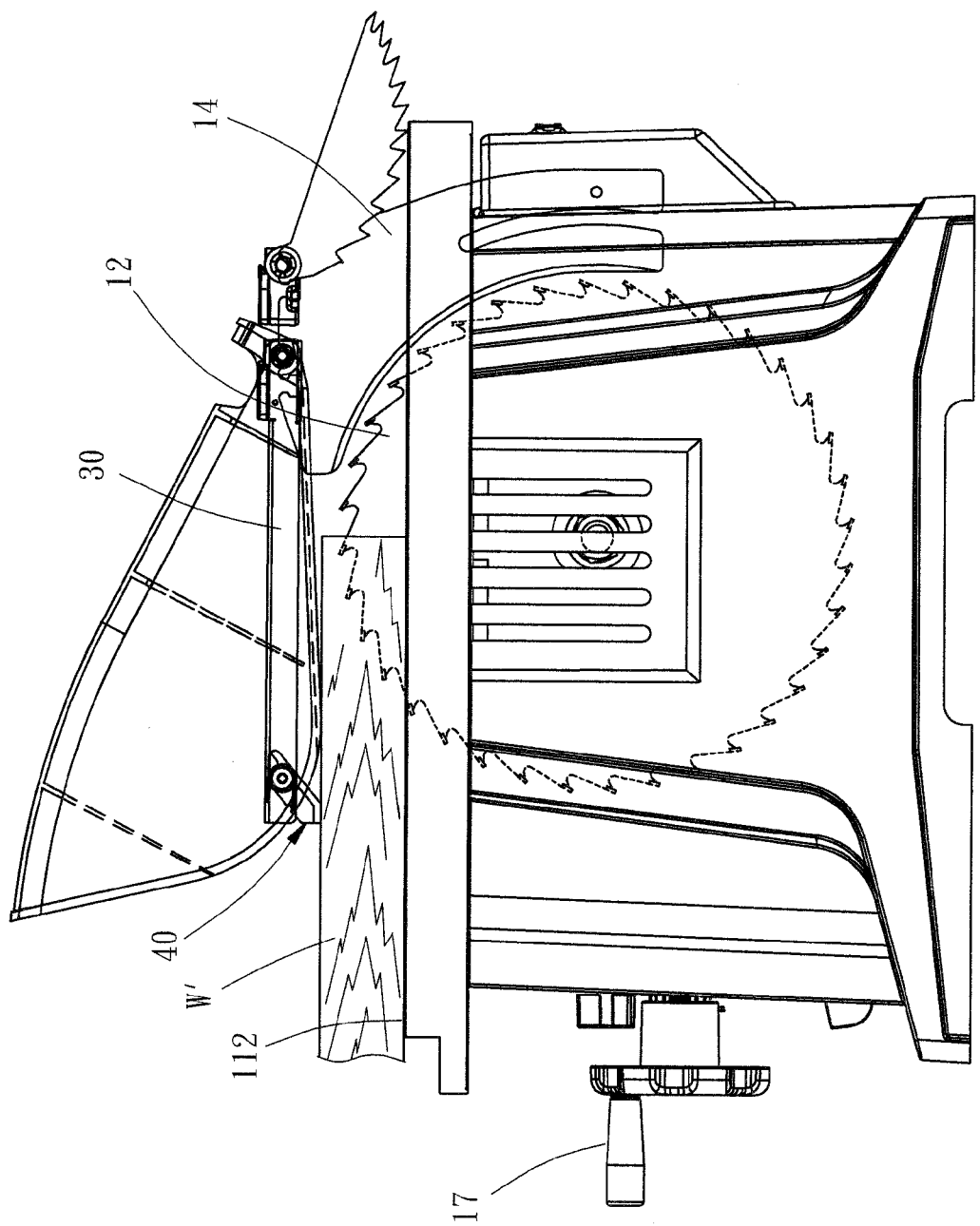
FIG. 5 is a schematic drawing showing that a workpiece is allowed to pass through the workpiece feeding stopper and than is cut by the circular saw blade.

Referring to FIG. 5, when the handle 17 is operated to lower the saw blade 12 and the spreader 14, the support arm 30 will be lowered together with the spreader 14 and still kept in parallel to the worktable 112 to fit a relatively thinner workpiece W'.

Figure 6:
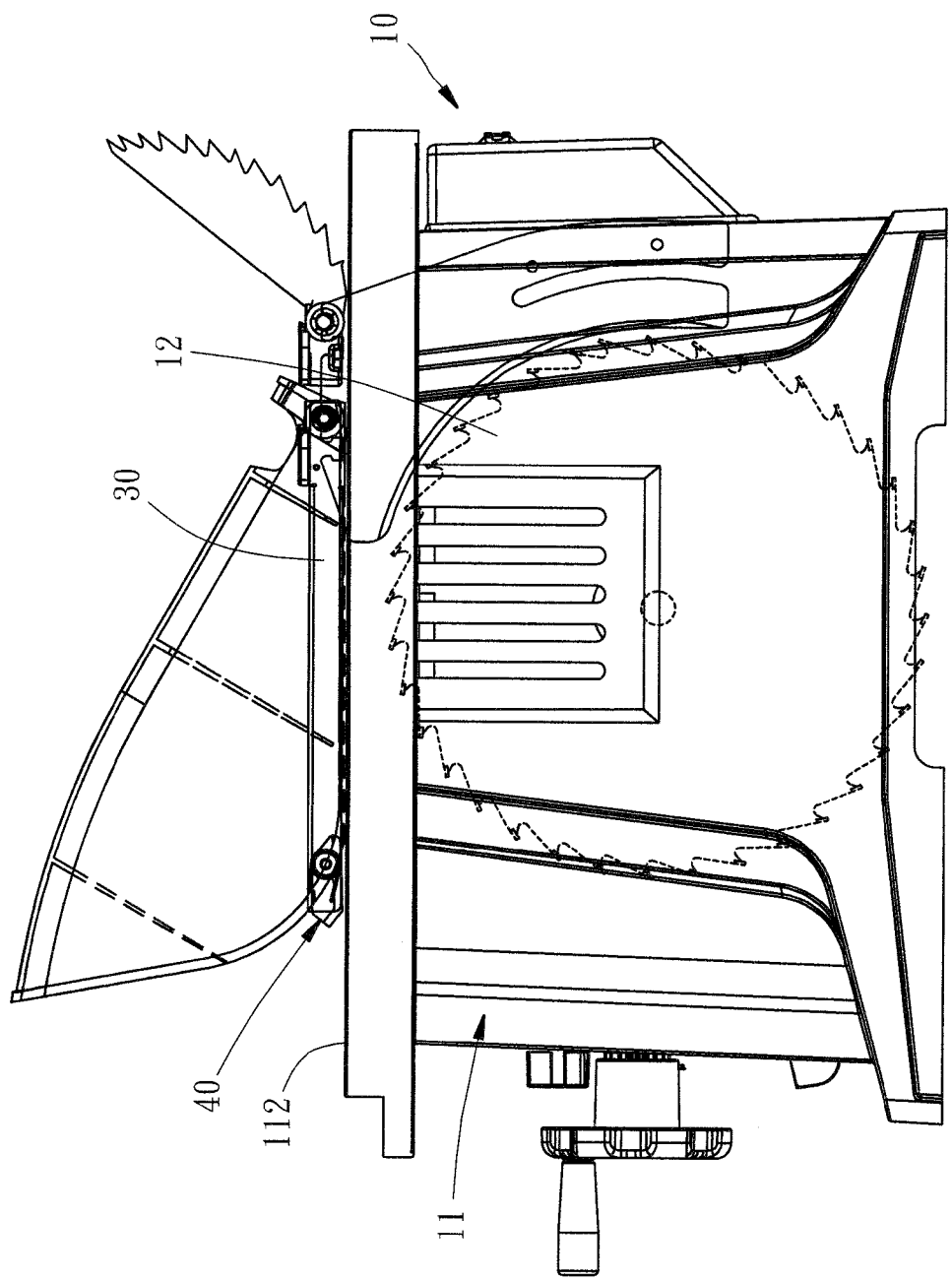
FIG. 6 is a schematic drawing showing that the workpiece feeding stopper halls with the spreader to a lowest elevation.

Referring to FIG. 6, when the saw blade 12 is completely received inside the machine base 11, the support arm 30 is closely attached to the worktable 112, and the stop member 40, which is forced to bias in one direction, is received inside the support arm 30 too, so that the dimension of the table saw 10 in the non-working status is minimized.

Figure 7:
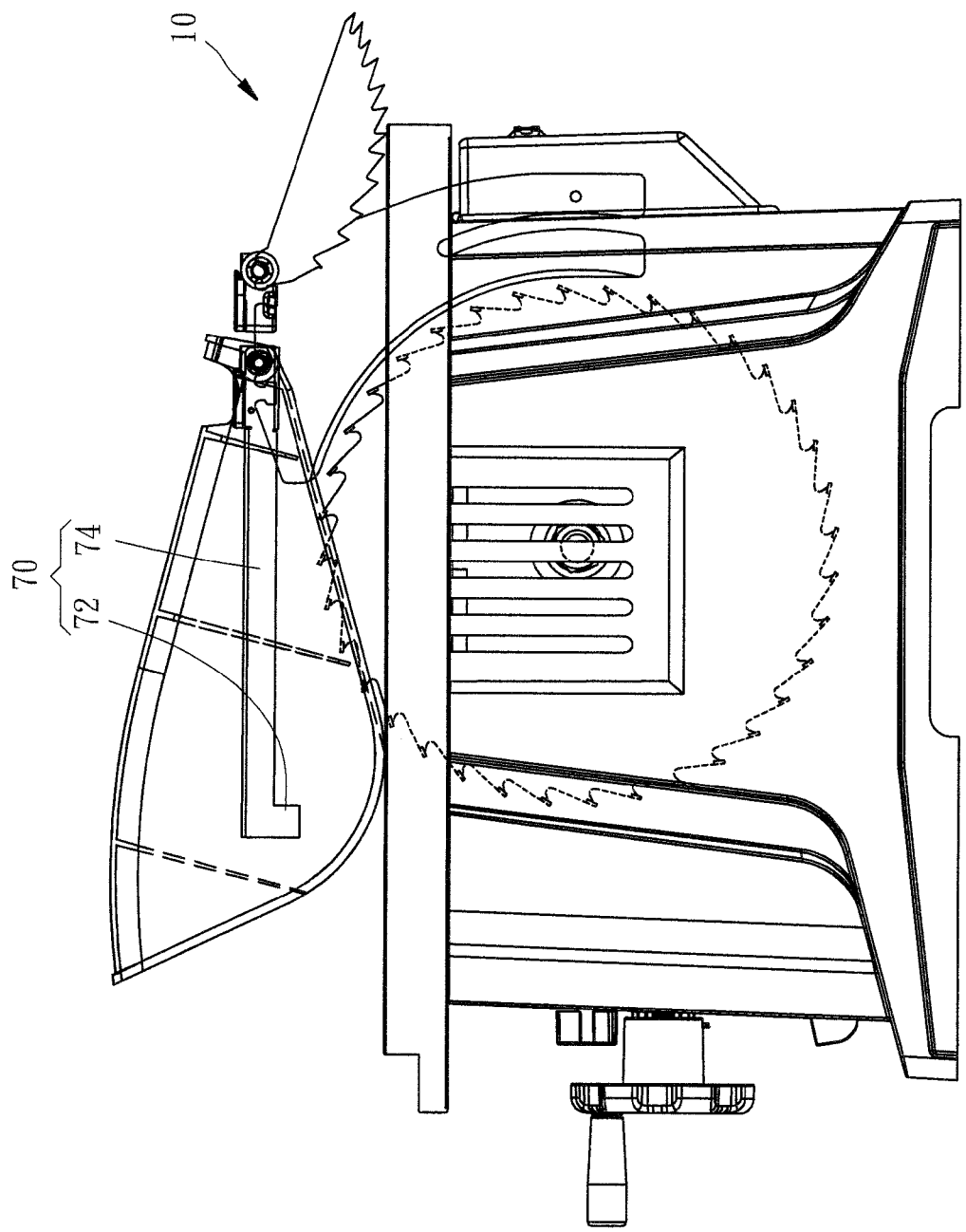
FIG. 7 is a side view showing that a workpiece feeding stopper in accordance with a second preferred embodiment of the present invention is installed in a table saw.

FIG. 7 illustrates a workpiece feeding stopper 70, which is installed in a table saw 10, in accordance with a second preferred embodiment of the present invention. According to this embodiment, the stop member 72 is integrally formed with the front end of the support arm 74. This embodiment achieves the same effects as the aforesaid first embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A workpiece feeding stopper and a table saw having a machine base with a worktable, a circular saw blade moveable downwards and upwards relative to the worktable, a spreader movable downwards and upwards together with the circular saw blade, and a blade guard pivotally connected with the spreader by a pivot, the workpiece feeding stopper comprising:
    a support arm having a rear end for connection with the spreader, and a front end; and
    a stop member provided at the front end of the support arm and having a stop face with a bottom edge;
    wherein the stop member is pivotally connected with the front end of the support arm, and is positioned to block work pieces from approaching and contacting the saw blade, the stop member having a bottom edge located in front of the circular saw blade and spaced above the worktable by a distance smaller than a distance between the pivot and the worktable.

2. The workpiece feeding stopper as claimed in claim 1, further comprising an elastic member supporting the stop member in position.

3. The workpiece feeding stopper as claimed in claim 1, wherein the stop member is integrally and fixedly provided at the front end of the support arm.

4. The workpiece feeding stopper as claimed in claim 1, wherein the distance between the bottom edge of the stop face of the stop member and the worktable of the machine base is slightly greater than or equal to a cutting depth of the saw blade.

5. The workpiece feeding stopper as claimed in claim 4, wherein a difference in the range of within 10 mm exists between the distance between the bottom edge of the stop face of the stop member and the worktable of the machine base and the cutting depth.

6. A table saw comprising:
    a machine base having a worktable;
    a circular saw blade disposed in the machine base and movable upwards and downwards relative to the worktable;
    a spreader disposed in back of the circular saw blade and movable upwards and downwards together with the saw blade relative to the worktable;
    a blade guard pivotally connected with the spreader by a pivot; and
    a workpiece feeding stopper connected with the spreader and movable upwards and downwards together with the spreader relative to the worktable, the workpiece feeding stopper having a stop face with a bottom edge located in front of the circular saw blade and spaced above from the worktable by a distance smaller than a distance between the pivot and the worktable of the machine base; and the workpiece feeding stopper comprises a support arm disposed above the circular saw blade and a stop member having a part forming the stop face, the support arm having a rear end connected with the spreader; and wherein the stop member is pivotally connected with the front end of the support arm, and is positioned to block work pieces from approaching and contacting the saw blade.

7. The table saw as claimed in claim 6, further comprising a quick release detachably connecting the rear end of the support arm to a top side of the spreader.

8. The table saw as claimed in claim 6, wherein the support member and the stop member are integrally connected with each other.

9. The table saw as claimed in claim 6, wherein the distance between the bottom edge of the stop face of the stop member and the worktable of the machine base is slightly greater than or equal to a cutting depth of the saw blade.

10. The table saw as claimed in claim 9, wherein a difference in the range of within 10 nm exists between the distance between the bottom edge of the stop face of the stop member and the worktable of the machine base and the cutting depth.

* * * * *